Jan. 14, 1969            J. D. FRASIER            3,421,512
IMPLANTED ELECTRICAL DEVICE WITH BIOLOGICAL POWER SUPPLY
Filed Dec. 15, 1965
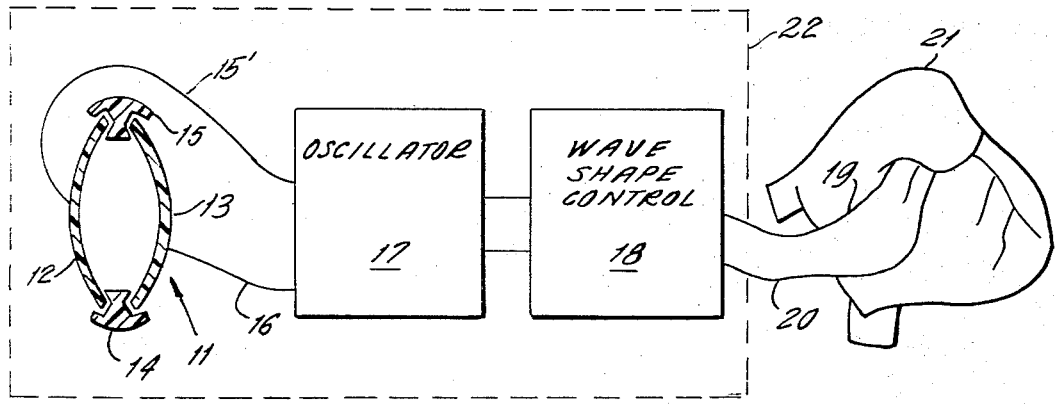
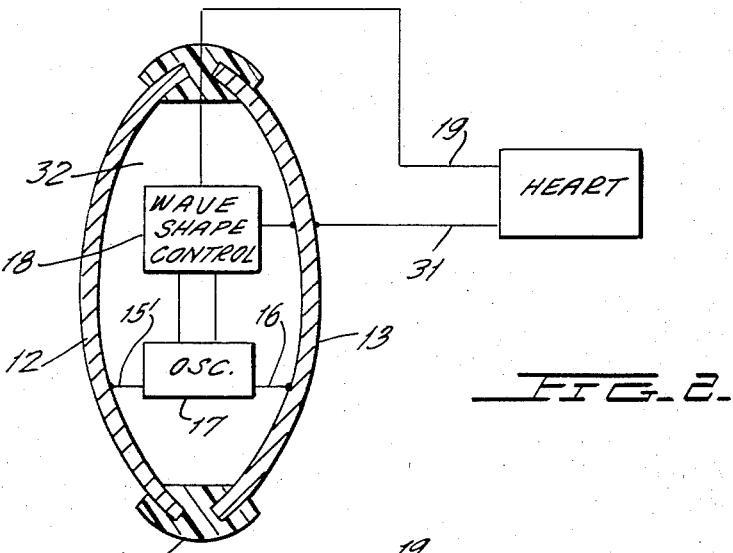
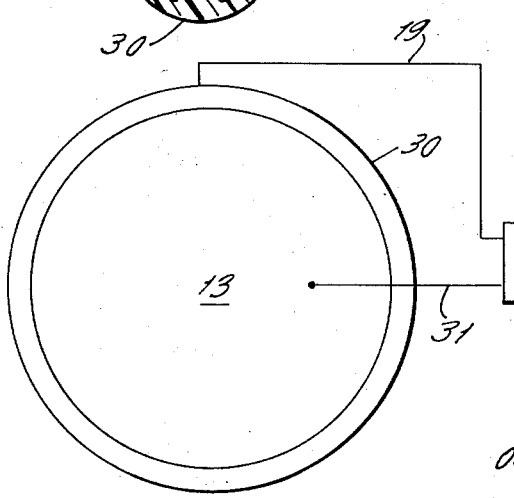
INVENTOR.
JORDAN D. FRAISER
BY
OSTROLENK, FABER, GERB & SOFFEN
ATTORNEYS United States Patent Office 3,421,512
Patented Jan. 14, 1969

3,421,512
IMPLANTED ELECTRICAL DEVICE WITH
BIOLOGICAL POWER SUPPLY
Jordan D. Frasier, Orange, Calif., assignor to International
Rectifier Corporation, El Segundo, Calif., a corporation
of California
Continuation-in-part of application Ser. No. 316,998,
Oct. 17, 1963. This application Dec. 15, 1965, Ser.
No. 513,932
U.S. Cl. 128—419                                5 Claims
Int. Cl. A61m 1/36

ABSTRACT OF THE DISCLOSURE

An implanted Pacemaker in which the electrical components are contained in a sealed housing formed by electrode plates which are hermetically sealed to one another. The electrode plates are of a nature to react with body fluids to form the power supply for electrical circuitry contained within the sealing volume. Output leads extend through the insulation ring which joins the two electrodes.

---

This application is a continuation-in-part of copending application Ser. No. 316,998, now abandoned, filed Oct. 17, 1963, in the name of Jordan Frasier, entitled "Implanted Pacemaker," and assigned to the assignee of the present invention.

This invention relates to an implanted Pacemaker which uses the body fluids as an electrolyte with the electrodes serving the function of power generating electrodes further serving as a housing for the electronic components of the Pacemaker.

Carefully controlled electronic impulses have found widespread use in the medical field for the treatment of patients. Such controlled electronic signals have found widespread use in the correction of certain heart deficiencies. Cardiac arrest is a medical condition that demands prompt attention. Abnormal heartbeat, or no heartbeat, constitutes a fatal condition if not corrected within a matter of minutes. Cardiac arrest, in the form of cardiac standstill, which is a condition in which the heart muscle does not contract at all, is treated by stimulating the heart with electrical pulses of a predetermined type. These pulses may be generated by a form of electronic equipment typically known as the "Pacemaker." Application of such pulses, in a periodic manner, have the ability of causing the heart muscle to contract in a repetitive manner, thus allowing the heart to return to its normal pumping rhythm. The electronic pulses applied normally have pulse durations in the range of 2–4 milliseconds and pulse rates in the range of 20–200 pulses per minute.

Original attempts in the Pacemaker field involved an external signal generator, or Pacemaker, having external electrodes attached to the patient's chest. Such devices require considerable power output capabilities, thereby requiring instruments of substantial size. These disadvantages led to the development of an external Pacemaker with the electrodes from the Pacemaker being implanted within the body and directly to the patient's heart. While the output power capabilities of the Pacemaker is substantially reduced in such an embodiment, the danger of infection, due to electrodes extending through the patient's skin, plus the awkward mobility of the Pacemaker device, lend additional disadvantages to such an embodiment.

The next development step led to the implanted Pacemaker device, which is preferably a transistorized type of signal generator, so that it will be small. This arrangement permits substantially permanent implanting of the Pacemaker. The energy source provided for the Pacemaker is presently comprised of a plurality of mercury cells, which are small in size and have life expectancies of approximately five years. However, safety features have been provided for such Pacemaker devices which take the form of leads extending from the Pacemaker which are implanted slightly below the skin. In cases where the power available from the power pack becomes substantially reduced, the leads located slightly beneath the skin may be short-circuited, cutting out resistances placed across the output of the power pack so as to increase the amount of input power to the Pacemaker device.

Thus, when the output power of the implanted power pack becomes substantially reduced, so as to impair the effectiveness of the Pacemaker, it becomes necessary to perform surgery in order to take advantage of the safety feature. Also, when the battery pack wears out, or experiences a failure, it is necessary to surgically remove and replace the defective power pack.

The present invention provides a novel power source having an indefinite useful operating life, thus markedly increasing the effectiveness of the Pacemaker and reducing the necessity for surgery in order to replace the power pack.

The invention is comprised of a power source having first and second dissimilar metals utilizing the body fluid as an electrolyte providing a continuous source for generating voltage which does not require periodic replacement. The dissimilar metals selected may be any metals which do not react with the body fluid. That is, the electrodes are of materials which will not cause generation of antibodies by the wearer. Typical choices may be platinum and stainless steel. The output of the power source is then converted to a substantially sinusoidal signal, is stepped up by suitable transformer means and then suitably rectified and shaped so as to provide a half-wave type signal for application to the heart.

An important feature of the present invention lies in the use of extended electrodes which are connected together by means of a suitable insulation gasket extending around the electrodes to further define an enclosed volume. This enclosed volume is then used as the means for receiving and housing in a sealed manner the electronic components used for the Pacemaker.

One output electrode is then taken through the assemblage in insulated relation with respect to the assemblage, while the second electrode may be taken directly from one of the plates with these two leads thereafter being connected to the myocardium and held therein by suitable sutures.

Further means may also be provided for regulating the repetition rate of the half-wave type pulses generated by the Pacemaker so as to accommodate the body requirements of the individual patient.

It is, therefore, one object of the invention to provide a novel power source for electrical devices.

Another object of the invention is to provide a novel power source for an electrical device which may be implanted into the body of the patient.

Still another object of the invention is to provide a novel power source for an electrical device which may be implanted into the body of a patient and which has an extremely long useful operating life.

Another object of the invention is to provide a novel power source for electrical devices and the like wherein the body fluids are utilized as an electrolyte for the power source.

Still another object of the invention is to provide a novel power source for electrical devices and the like to cooperate with the body fluids which are utilized as an electrolyte for the power source.

Another object of the invention is to provide a novel power source for electrical devices where the power source is comprised of two dissimilar metals which utilize the body fluids as an electrolyte wherein the metals employed are of the type which do not react with the body fluid.

Another object of the invention is to provide a novel power source for electrical devices where the power source is comprised of two dissimilar metals which utilize the body fluids as an electrolyte wherein the metals employed are of the type which do not react with the body fluid such as platinum and stainless steel.

A further object of this invention is to provide a novel implanted electrical device which can be directly inserted into the human body, and which includes housing walls of two dissimilar metals insulated from one another to serve as a housing for the electronic components of the electrical device.

These and other objects of the instant invention will become apparent when reading the accompanying description and drawings, in which:

FIGURE 1 shows a block diagram of a Pacemaker device designed in accordance with the present invention.

FIGURE 2 illustrates the manner in which the electronic components of FIGURE 1 can be contained within the electrodes of FIGURE 1 which define sealed housing surfaces for the electronic equipment.

FIGURE 3 is a side view of the housing of FIGURE 2.

Referring now to the drawings, FIGURE 1 shows a Pacemaker device 10 which is of the type that may be implanted into the body of a patient (not shown). The Pacemaker device 10 is comprised of a power source 11 formed of two dissimilar metallic elements 12 and 13. The metallic elements chosen are of the type that will electrolytically react with the body fluids. Preferable choices are platinum and stainless steel, but any other suitable dissimilar metallic elements may be employed. Insulating members 14 and 15 are provided as shown, for the purpose of spacing and electrically insulating the elements 12 and 13 from one another. The body fluids (not shown) are permitted to make physical contact with metallic elements 12 and 13, thereby acting as an electrolyte, causing the power source 11 to operate as a battery source. The power produced by the power source 11 is taken from conductive leads 15' and 16, to be impressed upon a suitable transistor oscillator means 17, which is comprised of circuitry for generating an A-C or sinusoidal signal from the D-C power supplied by the power source 11, and is further provided with transformer means (not shown) for the purpose of stepping up the sinusoidal voltage provided to a suitable magnitude for Pacemaker use.

The output of the oscillator 17 is impressed upon wave-shaping and control means 18, which provides a half-wave rectified type output signal wherein the pulses have a shape suitable for use as a Pacemaker device. The repetition rate of the output pulse train may be in the range of 20–200 pulses per minute and have pulse durations of 2–4 milliseconds.

Typical oscillator and wave-shaper control circuits which may be employed herein are set forth in U.S. Patent 3,057,356, issued to W. Greatbatch; however, any other suitable circuits may be employed, the particular one selected lending no novelty to the present invention. The wave-shaping and control elements of the Pacemaker device normally employ suitable resistors and capacitor elements having values which determine the repetition rate of the signal pulse train as well as the wave-shape thereof.

The output of the wave-shaper control is impressed by leads 19 and 20, which have their opposite ends connected to the myocardium (heart muscle) and are held in place by suitable sutures (not shown) to the heart 21. The conductive leads 19 and 20, as well as leads 15' and 16, are preferably Teflon covered to prevent any conductive path between the elements through the medium of the body fluids. The entire Pacemaker device 10 may be encased in a suitable plastic casing, shown diagrammatically by the dotted rectangle 22, with the casing having suitable structure for electrically isolating the oscillator 17 and wave-shaper 18 from the body fluids, while enabling the body fluids to make physical contact with the dissimilar metallic elements 12 and 13. The entire unit is a compact package which may be implanted in the chest wall and which occupies a relatively small space within the patient's body. The power source 11 provides a continuous D-C voltage for the Pacemaker device 10 and provides the useful operating life which is markedly greater than the useful operating lives of prior art power packs, thus substantially eliminating the need for periodically performing surgery for replacement of the power source.

It can therefore be seen that the instant invention provides a Pacemaker device having an extremely long lasting power source to provide suitable operation for the Pacemaker in order to sustain a normal heartbeat.

In accordance with the present invention, the electrodes 12 and 13 can be sealed by a continuous insulation band 30 which may have the cross-section of insulating members 14 and 15. The interior of this sealed housing can then contain electronic components 17 and 18, or any other desired electronic equipment with lead 19 being taken through the sealing band 30, while lead 20 can be internally directly connected to electrode 13 which serves as a common electrode with the second output lead 31 to the heart being directly connected to the exterior surface of electrode 13.

In an arrangement of the type shown in FIGURES 2 and 3, it will be apparent that the electronic equipment will now be completely enclosed within the sealed volume 32 which uses electrodes 12 and 13 as housing wall portions, thereby to remove the electronic equipment from any possible reaction with the body.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. An implanted electrical device comprising first and second electrodes of dissimilar materials; a sealed volume including said first and second electrode means as major wall portions thereof and insulation means extending between only the outer peripheries of said first and second electrode means to define said sealed volume; an electronic circuit means for generating electrical output signals contained within said sealed volume; input circuit connections to said electronic circuit means connected to said first and second electrode means, respectively; an output lead means for said electronic circuit means; said output lead means extending through said insulation means and in a sealed relationship with respect thereto.

2. The device substantially as set forth in claim 1 wherein said first and second electrode means are selected from metals of the group which do not react with any body fluid and which will generate an output voltage when immersed in body fluids which act as an electrolyte.

3. The device substantially as set forth in claim 2 wherein said first and second electrode members are respectively of stainless steel and platinum.

4. The device substantially as set forth in claim 1 wherein said electronic circuit means includes oscillator means connected to said first and second electrode means for converting the D-C output voltage of said electrode means to an A-C signal, and wave-shape control means connected to said oscillator means for controlling the wave-shape and pulse duration of the output voltage of said oscillator means.

5. The device substantially as set forth in claim 1 wherein said insulation means is of a material selected from the group which does not react to body fluids.

(References on following page)

References Cited

UNITED STATES PATENTS

| | | | |
|---|---|---|---|
| 3,057,356 | 10/1962 | Greatbatch | 128—422 |
| 3,133,537 | 5/1964 | Muth | 128—2 |
| 3,345,989 | 10/1967 | Reynolds | 128—419 |
| 3,353,539 | 11/1967 | Preston | 128—419 |

FOREIGN PATENTS

| | | |
|---|---|---|
| 371,998 | 10/1963 | Switzerland. |

OTHER REFERENCES

MacKay et al.: "Electronics, Engineering Edition," Jan. 3, 1958, pp. 51–53.

RICHARD A. GAUDET, *Primary Examiner.*

WILLIAM E. KAMM, *Assistant Examiner.*